United States Patent
Kraus et al.

[15] 3,637,348
[45] Jan. 25, 1972

[54] CONTROL OF POSTPRECIPITATION FROM WET PROCESS PHOSPHORIC ACID

[72] Inventors: John W. Kraus, Fairfax, Va.; Casimer Claudius Legal, Jr., Elkridge, Md.

[73] Assignee: W. R. Grace & Co., New York, N.Y.

[22] Filed: Oct. 24, 1969

[21] Appl. No.: 869,319

[52] U.S. Cl. ........................... 23/165, 210/54, 209/5
[51] Int. Cl. .................................................. C01b 25/22
[58] Field of Search .............. 23/165, 165 B; 210/54; 209/5

[56] References Cited

UNITED STATES PATENTS

| | | | |
|---|---|---|---|
| 2,936,888 | 5/1960 | Williams | 23/165 X |
| 3,481,700 | 12/1969 | Legal et al. | 23/165 |
| 3,528,771 | 9/1970 | Shearon et al. | 23/165 |

FOREIGN PATENTS OR APPLICATIONS

| | | | |
|---|---|---|---|
| 280,969 | 4/1914 | Germany | 23/165 |

Primary Examiner—Oscar R. Vertiz
Assistant Examiner—Gregory A. Heller
Attorney—Charles L. Harness and Kenneth E. Prince

[57] ABSTRACT

This invention is directed to controlling the rate and amount of postprecipitate that forms in merchant grade phosphoric acid by treating the acid with cresylic acid, picoline, pyridine and their homologues. This treatment is useful as a control against postprecipitation in the wet process preparation of phosphoric acid. The use of cresylic acid, picoline, and pyridine, and their homologues has been found to cause rapid precipitation of solids from the phosphoric acid, thereby improving the purity of the phosphoric acid in a shorter period of time than previously possible.

10 Claims, 1 Drawing Figure

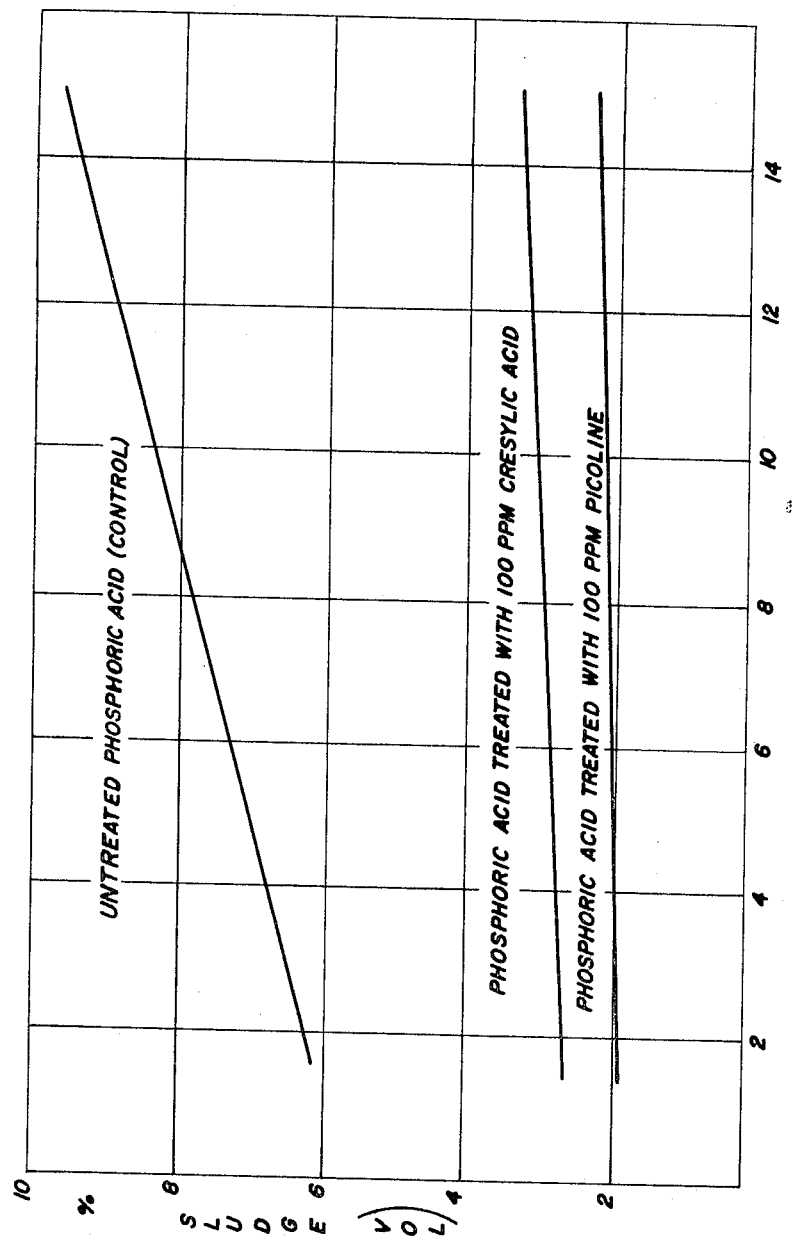
John W. Kraus
Casimer C. Legal, Jr.
INVENTOR
BY Charles L. Harness
ATTORNEY

CONTROL OF POSTPRECIPITATION FROM WET PROCESS PHOSPHORIC ACID

An important object of this invention is to control the rate and decrease the amount of post precipitate that forms in merchant grade phosphoric acid.

As is well known in the prior art, in the wet process preparation of phosphoric acid, the concentrated acid is permitted to settle for 24 hours, allowing the solids of $CaSO_4 \cdot \frac{1}{2}H_2O$, $CaF_2$ and fluosilicate salts to precipitate. However, even after this time there is still a formation of postprecipitation products such as those already mentioned and also a formation of complex iron and aluminum phosphate salts which also precipitate from the concentrated phosphoric acid (54% $P_2O_5$). These latter salts constitute the bulk of what is commonly referred to as sludge. The formation of the sludge is found to be both costly and time consuming to industry. It collects in the bottom of tank cars and cannot be pumped. It must be cleaned out manually.

One approach has been to treat the acid so as to cause the sludge to precipitate before shipment, so that it could be removed in the acid plant instead of from the bottom of tank cars. With this intent, the prior art has tried flocculating agents such as fluosilicic acid, laurylamine, boric acid and organic polymers, together with decantation or centrifugation, as well as solvent extraction techniques. However, none has proven to be totally effective with different lots of acid.

It has been discovered that when 1 to 1,000 p.p.m., or, preferably, 80–120 p.p.m. of cresylic acid, picoline, pyridine, or their homologues are added to freshly concentrated $H_3PO_4$ (52–55% $P_2O_5$), there is a rapid precipitation of solids from the acid which can be separated from the acid by decantation (i.e., sedimentation), filtration, or centrifugation and that additional precipitation of sludge on prolonged standing is minor.

The materials contemplated for such sludge control have the formulas

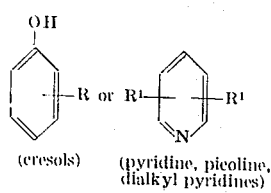

(cresols)    (pyridine, picoline, dialkyl pyridines)

in which R is lower alkyl and each $R^1$ is independently either hydrogen or lower %

EXAMPLE 1

Phosphoric acid was treated by first mixing 6,956 g. of freshly concentrated acid (55% $P_2O_5$) with 0.6956 g. (100 p.p.m.) of cresylic acid, a coal tar acid (ortho-cresol 98 percent and stirring the resulting suspension for approximately 18 hours at a temperature of 70° C. Suspended solids in the acid were then removed by centrifugation, thus concluding the clarification step. The clarified acid was set aside to age for 15 days, during which time the acid temperature was programmed to the following schedule: the first 4 days after treatment, 70° C., the next 4 days at 50° C., and the final 7 days at 25° C. Daily sightings of postprecipitate volumes were made and recorded. At the conclusion of the study the sludge and acid were separated by centrifugation and the weight of each measured. The rate of postprecipitation in the treated acid was rapid during the first 24 hours following treatment, but amounted to only 1.8 percent (vol.) of the total acid volume (500 ml.). Aging for 15 additional days showed an increase of 0.4 percent to a final sludge volume of 2.2 percent (vol.) (FIG. 1); the corresponding final sludge weight equalled only 0.12 percent (wt.), basis total weight of acid.

Ethyl cresol work about equally well.

EXAMPLE 2

A similar sample of concentrated acid (53.7% $P_2O_5$) was treated in the same way as example 1, except that no cresylic acid was added. The rate of postprecipitation was rapid during the first 24 hours and equalled 6.0 percent (vol.) of the total acid volume, which increased daily with aging until a final sludge volume of 9.6 percent was accumulated after 15 days (FIG. 1). The corresponding final sludge weight amounted to 3.0 percent (wt.) basic total weight of acid.

The preceding two examples illustrate that as a result of treatment with cresylic acid there is a greater rate of postprecipitation during the first 24 hours, compared to untreated acid. Further postprecipitation in the treated acid is negligible over an extended period of 15 days, whereas precipitation continues to increase in the untreated acid. The end result was a 27 percent decrease in the amount of sludge formed when cresylic acid was used as compared to the absence of treatment.

EXAMPLE 3

Phosphoric acid was treated by mixing 7,077 g. of freshly concentrated acid (55% $P_2O_5$) with 0.7077 g. (100 p.p.m.) of picoline, a coal tar base, and stirring the suspension for approximately 18 hours at 70° C. Suspended solids in the acid were removed by centrifugation. The clarified acid was aged 15 days, while the acid temperature was maintained as follows: the first 4 days after treatment, 70° C., the next 4 days at 50° C. and the final 7 days at 25° C. Daily sightings of postprecipitation volumes were made and recorded. At the conclusion of the study, the sludge and acid were separated by centrifugation and the weight of each measured. The rate of postprecipitation in the treated acid was rapid during the first 24 hours following treatment and amounted to only 2.5 percent volume of the total acid volume (500 ml.). With aging, the sludge volume increase to a final value of 3.3 percent (vol.), FIG. 1; the corresponding final sludge weight equalled 0.12 percent (wt.), basis total weight of acid.

The results obtained from example 3 show that when compared with the results obtained from example 2 (the untreated sample) there is a rapid postprecipitation during the first 24 hours and after an extended period of 15 days, there was a decrease of 72 percent compared to the untreated sample. Thus illustrating that the use of picoline as a flocculant does improve the postprecipitation behavior of phosphoric acid.

Further, existing data indicates that sedimentation is essentially completed during the first 24 hours following addition of the flocculating agents.

In lieu of the precise temperature programmings of the examples, somewhat broader ranges are operable in the respective instances, viz, maintaining the phosphoric acid at a temperature in the range of about 55°–85° C. for the 4 days following treatment, then dropping to a temperature in the range of about 40°–60° C. for the next 4 days, followed by a temperature in the range of about 20°–30° C. for the next 7 days.

The FIGURE illustrates the comparative effect of adding the flocculants described in examples 1 and 3 to the wet process phosphoric acid and the amount of sludge which is formed (after 24 hours) when the phosphoric acid is not treated with an appropriate flocculant.

As can be seen the use of the herein described coal tar bases or acids can improve the rate and amount of postprecipitation in the wet process manufacture of phosphoric acid.

In addition to cresylic acid and picoline of the examples, pyridine and its lower alkyl homologues are also suitable. The dialkyl pyridines, especially dimethyl pyridines, are excellent for postprecipitation control in accordance with this invention.

What is claimed is:

1. The method of controlling postprecipitation of freshly concentrated phosphoric acid comprising adding to the acid, with agitation, about 1–1,000 p.p.m. of a flocculant selected from the group consisting of

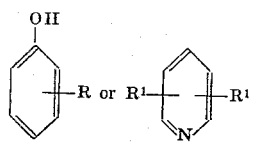

in which R is a lower alkyl, and each R¹ is independently either hydrogen or lower alkyl, whereby sludge precipitates more rapidly than if said flocculant had not been added, and removing said precipitate.

2. The method according to claim 1 whereby the treated phosphoric acid is stirred for about 18 hours at a temperature of about 70° C. and followed by removal of the suspended solids through centrifugation.

3. The method according to claim 1 whereby the treated phosphoric acid is stirred for about 18 hours at a temperature of about 70° C. and followed by removal of the suspended solids through sedimentation.

4. The method according to claim 1 whereby the treated phosphoric acid is stirred for about 18 hours at a temperature of about 70° C. and followed by removal of the suspended solids through filtration.

5. The method according to claim 1 in which the phosphoric acid is maintained at a temperature in the range of about 55°–85 C. for the 4 days following treatment, in the range of about 40°–60° C. the next 4 days, and in the range of about 20°–30 C. for the next 7 days.

6. The method according to claim 1 whereby the amount of said flocculant added to the phosphoric acid is in the amount of about 80–120 p.p.m.

7. The method according to claim 1 in which the flocculant is a cresol.

8. The method according to claim 1 in which the flocculant is a picoline.

9. The method according to claim 7 in which the cresol is ethyl cresol.

10. The method according to claim 1 in which the flocculant is dimethyl pyridine.

* * * * *